US008001508B1

(12) United States Patent
Daud et al.

(10) Patent No.: US 8,001,508 B1
(45) Date of Patent: Aug. 16, 2011

(54) METHOD AND SYSTEM FOR ANALYZING INPUT/OUTPUT SIMULTANEOUS SWITCHING NOISE

(75) Inventors: Nafira Daud, Pleasanton, CA (US); Geping Liu, Sunnyvale, CA (US); San Wong, Cupertino, CA (US); Lawrence David Smith, San Jose, CA (US)

(73) Assignee: Altera Corporation, San Jose, CA (US)

( * ) Notice: Subject to any disclaimer, the term of this patent is extended or adjusted under 35 U.S.C. 154(b) by 766 days.

(21) Appl. No.: 11/877,072

(22) Filed: Oct. 23, 2007

Related U.S. Application Data

(60) Provisional application No. 60/910,805, filed on Apr. 9, 2007.

(51) Int. Cl.
*G06F 17/50* (2006.01)
(52) U.S. Cl. .................. 716/115; 716/109; 716/136
(58) Field of Classification Search .................. None
See application file for complete search history.

(56) References Cited

U.S. PATENT DOCUMENTS 6,102,960 A * 8/2000 Berman et al. .......... 703/17
6,868,374 B1 * 3/2005 Ditlow et al. .......... 703/18
7,454,301 B1 * 11/2008 Daud et al. .......... 702/69

OTHER PUBLICATIONS

Chun et al., "Model to Hardware Correlation for Power Distribution Induced I/O Noise in a Functioning Comptuer System," 2002 Electronic Components and Technology Conference, pp. 319-324.*
Liu et al., "Analyzing FPGA Simultaneous Switching Noise in Printed CIrcuit Boards," 2006 IEEE, pp. 377-382.*
Shi et al., "Simultaneous Switching Noise in FPGA and Structure ASIC Devices, Methodologies for ANalysis, Modeling, and Validation," 2006 Electronic Components and Technology Conference, pp. 229-236.*
Secker et al., "Effects and Modeling of Simultaneous Switching Noise for BiCMOS Off-Chip Drivers," IEEE Trans. on Components, Packaging, and Manufacturing Technology—Part B, vol. 19, No. 3, Aug. 1996, pp. 473-480.*
Suresh et al., "Package-silicon co-design—Experiment with an SOC deisgn," Proc. of the 17$^{th}$ Int'l Conference on VLSI Design (VLSI'04), 2004 IEEE, 6 pages.*

* cited by examiner

*Primary Examiner* — Leigh Marie Garbowski
(74) *Attorney, Agent, or Firm* — Martine Penilla & Gencarella, LLP

(57) ABSTRACT

A method for optimizing pin selection for an integrated circuit is provided. Pin locations are mapped to a vector. The mutual inductive relationships between pins of the integrated circuit are captured into a matrix. The matrix contains the data of how a signal state of each pin is affected by the toggling of other pins within the I/O bank. The pin locations and the crosstalk matrix are combined to characterize the impact of the crosstalk on the pins for the pin placement. Thereafter, a user may decide to alter the pin placement or alter the sampling interval for the pin to avoid sampling the pin when the crosstalk may affect the signal integrity. The method may be applied for multiple simultaneous switching noise cause mechanisms impacting the signal integrity. In this embodiment, a worst case cause mechanism from the individually quantified cause mechanisms is determined by comparing an impact of each of the cause mechanisms.

22 Claims, 17 Drawing Sheets

METHOD AND SYSTEM FOR ANALYZING INPUT/OUTPUT SIMULTANEOUS SWITCHING NOISE

This application claims priority from U.S. Provisional Patent Application No. 60/910,805, filed Apr. 9, 2007, and entitled "Method and System for Analyzing Input/Output Simultaneous Switching Noise." This provisional application is herein incorporated by reference.

BACKGROUND

Programmable logic devices, such as field programmable gate arrays (FPGAs), have traditionally been optimized for low cost environments where signal and power integrity are minor considerations. As the requirements for high speed memory and serial interfaces are becoming more prevalent, FPGA silicon and packages must be designed to provide good signal and power integrity while maintaining cost objectives. Some major impacts into signal integrity include simultaneous switching noise (SSN) as well as power supply quality. SSN is generated when drivers switch concurrently. Mutual coupling from aggressor signals to victims and delta-I noise associated with the inductance of power and ground paths are the primary mechanisms that cause noise during the rise/fall time of the aggressors. The change in current (di/dt) of the aggressors is responsible for the noise.

The power distribution network (PDN) for the package/die combination is also an important consideration in determining power supply quality. Due to the nature of PLDs, e.g., FPGAs, it is difficult to pre-determine how the circuits will be used. Furthermore, input/output (I/O) driver circuits may be required to service many different bus applications including stub series terminated logic (SSTL), high speed transceiver logic (HSTL), low voltage transistor-transistor logic (LVTTL), low voltage complementary metal oxide semiconductor (LVCMOS), low voltage differential signaling (LVDS), etc. Existing I/O SSN analysis tools are either classified as an inaccurate method based on extrapolation or interpolation of measured data that is quick to run, or an accurate method based on complex circuit level modeling or simulation that is very laborious and slow to run.

Accordingly, there is a need for an accurate and efficient I/O SSN analysis tool that can run multiple what-if analyses within a reasonable time frame to shorten the overall design cycle then provide confidence that the system would work.

SUMMARY

Broadly speaking, the present invention fills these needs by providing a method and system for optimizing pin selection to protect signal integrity in accordance with one embodiment. It should be appreciated that the present invention can be implemented in numerous ways, including as a method, a system, or an apparatus. Several inventive embodiments of the present invention are described below.

In one aspect of the invention, a method for optimizing pin selection for an integrated circuit is provided. Pin locations, which may be provided from a user, are mapped to a vector. The mutual inductive relationships between pins of the integrated circuit are captured into a matrix. The matrix may be referred to as a crosstalk matrix and essentially contains the data of how a signal state of each pin is affected by the toggling of other pins. The pin locations and the crosstalk matrix are combined to characterize the impact of the crosstalk on the pins for the specified pin placement. Thereafter, a user may decide to alter the pin placement or alter the sampling interval for the pin to avoid sampling the pin when the crosstalk may affect the signal integrity. Of course, the method may be applied for multiple simultaneous switching noise (SSN) cause mechanisms impacting the signal and power integrity in one embodiment. In this embodiment, a worst case cause mechanism from the individually quantified cause mechanisms is determined by comparing an impact of each of the cause mechanisms. Then, based on the results, the pin assignment or timing of signals may be adjusted to assure that a valid signal will be sampled from the pin.

In another aspect of the invention, a system for optimizing pin selection for an integrated circuit is provided. The system includes a database having a crosstalk matrix representing mutual inductive relationships between any two pins of the integrated circuit, a scaling factor look up table that tabulates scaling factors for each pin according to the number of pins toggling in each I/O bank, and a power distribution network database that characterizes a voltage sag on each pin of an I/O bank caused by transitioning pins within the I/O bank. The scaling factors represent a cumulative effect of the mutual inductive relationships on a pin based on the number of pins toggling. The system includes a central processing unit (CPU) and a memory. Stored within the memory is optimization logic stored configured to be executed by the CPU. The optimization logic is configured to access pin placement data for the integrated circuit. The optimization logic also calculates an impact on signal integrity from an inductive crosstalk effect. The impact from the inductive crosstalk effect is determined by combining the pin placement data with the crosstalk matrix resulting in the generation of a listing of voltages experienced by each pin of the integrated circuit due to the inductive crosstalk effect. This list can then be viewed by a user to determine if the pin assignments are acceptable. A bus enables communication between the CPU, the memory and the database.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for characterization of simultaneous switching noise (SSN) for an integrated circuit so that the signal and the power integrity of the integrated circuit are maintained. It will be obvious, however, to one skilled in the art, that the present invention may be practiced without some or all of these specific details. In other instances, well known process operations have not been described in detail in order not to unnecessarily obscure the present invention.

The embodiments described below provide accurate analysis based on I/O SSN mechanisms such as, crosstalk, power distribution network (PDN) noise, resonance, reflection, loading terminations, etc. Quick analysis is provided since the methodology described herein breaks down and analyzes the various problems in small blocks. Thus, the embodiments provide an accurate solution in a relatively short time frame. In one embodiment, a quick analysis to further reduce time would be to select major I/O SSN mechanisms, but not minor I/O SSN mechanisms. As used herein, major I/O SSN mechanisms are mechanisms that cause most, if not all, of the I/O system noise that the designers or customers should pay attention to, e.g., crosstalk and PDN noise. In addition, the techniques described herein provide voltage amplitude information as well as timing information.

Figure 1:
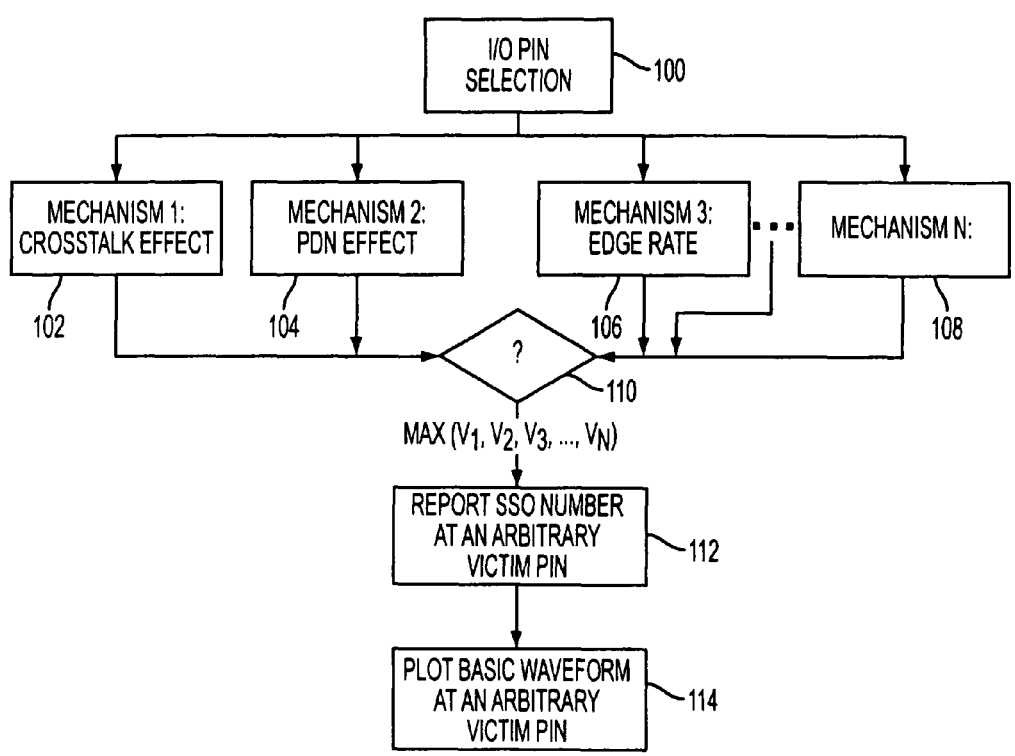
FIG. 1 is a high level flow chart diagram illustrating the technique for determining the components for SSN analysis in accordance with one embodiment of the invention.

FIG. 1 is a high level flow chart diagram illustrating the technique for determining the components for SSN analysis in accordance with one embodiment of the invention. The method initiates with operation 100 where I/O pin selection is defined. In one embodiment, the pin selection is provided by a customer or end user of the PLD. For example, the pin selection may be the basis for a vector indicating if a pin is enabled or disabled as described in more detail below. Following the pin assignment definition, the method proceeds to operations 102, 104, 106 and 108, which may be run in parallel or in series. In operation 102 the crosstalk effect is determined. In operation 104 the power distribution network effect on the noise is determined. In operation 106 the edge rate effect on the noise is determined, and so on. Operation 108 may embody any other effect or cause mechanism that can provide noise into the system, such as reflection, and loading, etc. Each of the effects from the above-described operations is then compared in decision operation I/O and a maximum value from these effects is selected. That is, in operation I/O a worst-case value is selected from the various noise effects. It should be appreciated that in some instances not all of the effects or cause mechanisms are applicable and may be eliminated from comparison operation I/O. After selection of the maximum value in operation I/O, a simultaneous switching output (SSO) number is reported at an arbitrary victim pin in operation 112. In one embodiment, a list of the pins is generated and the noise for a particular configuration and/or JO standard is provided. The method then proceeds to operation 114 where a basic waveform is plotted at the arbitrary victim pin. It should be appreciated that within a PLD, such as a FPGA, simultaneous switching noise is primarily caused by two distinct mechanisms, which may be referred to as major cause mechanisms. One of the mechanisms is inductive crosstalk while the other is power distribution network noise. The embodiments described herein provide techniques for quickly quantifying the individual contributions from each effect in order to determine impacts on a design. It should be appreciated that the procedure and technique described herein is independent of any circuit simulation engines, such as SPICE or similar simulation engines.

Figure 2:
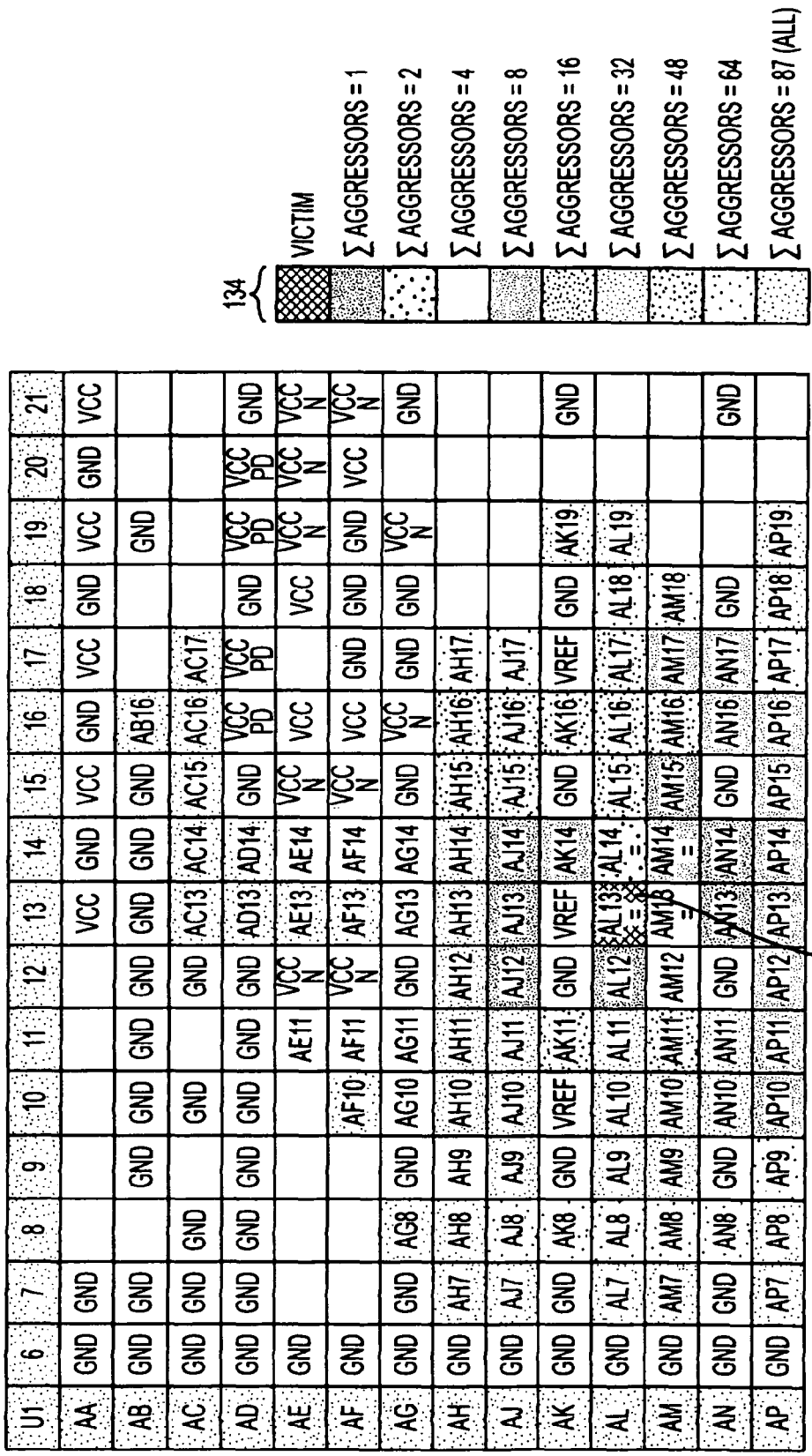
FIG. 2 is a simplified schematic diagram illustrating a pin map of an I/O bank for an exemplary PLD package in accordance with one embodiment of the invention.

FIG. 2 is a simplified schematic diagram illustrating a pin map of a I/O bank for an exemplary PLD package in accordance with one embodiment of the invention. One skilled in the art will appreciate that crosstalk and power delivery network noises have different causes. For a PLD, most of the inductive crosstalk occurs at the package/printed circuit board interfaces. Each signal ball of the package and its corresponding printed circuit board via form a current loop with the nearest ground ball and ground via. When multiple I/O pins toggle simultaneously, I/O transient currents flow along the signal loops. These I/O transient currents create time varying magnetic fields, which penetrate into neighboring signal loops and induce voltage noises. A PLD power delivery network consists of dye-, package-, and board-level components, which together supply power to the complimentary metal oxide semiconductor (CMOS) circuits. When a large number of CMOS output drivers switch at the same time, a substantial amount of current flow rapidly in the inductive circuit component of the PDN. This rapid change of current generates a delta-I voltage drop. These inductive parasitics are due to the interconnection structures, such as power balls of the ball grid array package and power vias in a printed circuit board. The exemplary board of FIG. 2 was used for bench measurements to illustrate the impact and the effectiveness of the embodiments described herein. In FIG. 2, the output drivers in the I/O bank are configured with SSTL-18 class 2 interface and 25 ohm on-chip termination (OCT) to generate SSN waveforms. In FIG. 2, victim pin 130 is either held at a logic high state or a logic low state to monitor the corresponding quiet high or quiet low noise. A spiral pattern was applied around victim pin 130 and the number of toggling aggressors were increased in steps of 1, 2, 4, 8, 16, 32, 48, 64 and a maximum of 87, as illustrated through legend 134. For this exemplary instance, the aggressors were toggling at 2.5 MHz. Both the aggressors and the victim pins were connected with a 4 inch long trace and two 50 ohm parallel terminations and a 5-pF loading capacitor. It should be appreciated that the impact on victim pin 130 at the various levels of aggressors switching may be captured and recorded or stored in a database. This may be repeated for other pins designated as the victim pin, thereby resulting in the generation of a crosstalk matrix representing the impact on specified pins being generated. Thus, FIG. 2 may represent a pin map for an I/O bank of a device from the assignee, such as a device from the STRATIX™ or CYCLONE™ families of devices. Crosstalk matrices for multiple devices may be generated and the mutual inductive relationships for the pins for each I/O standard can be characterized resulting in a database that contains multiple crosstalk matrices for numerous devices and numerous I/O standards.

Figure 3:
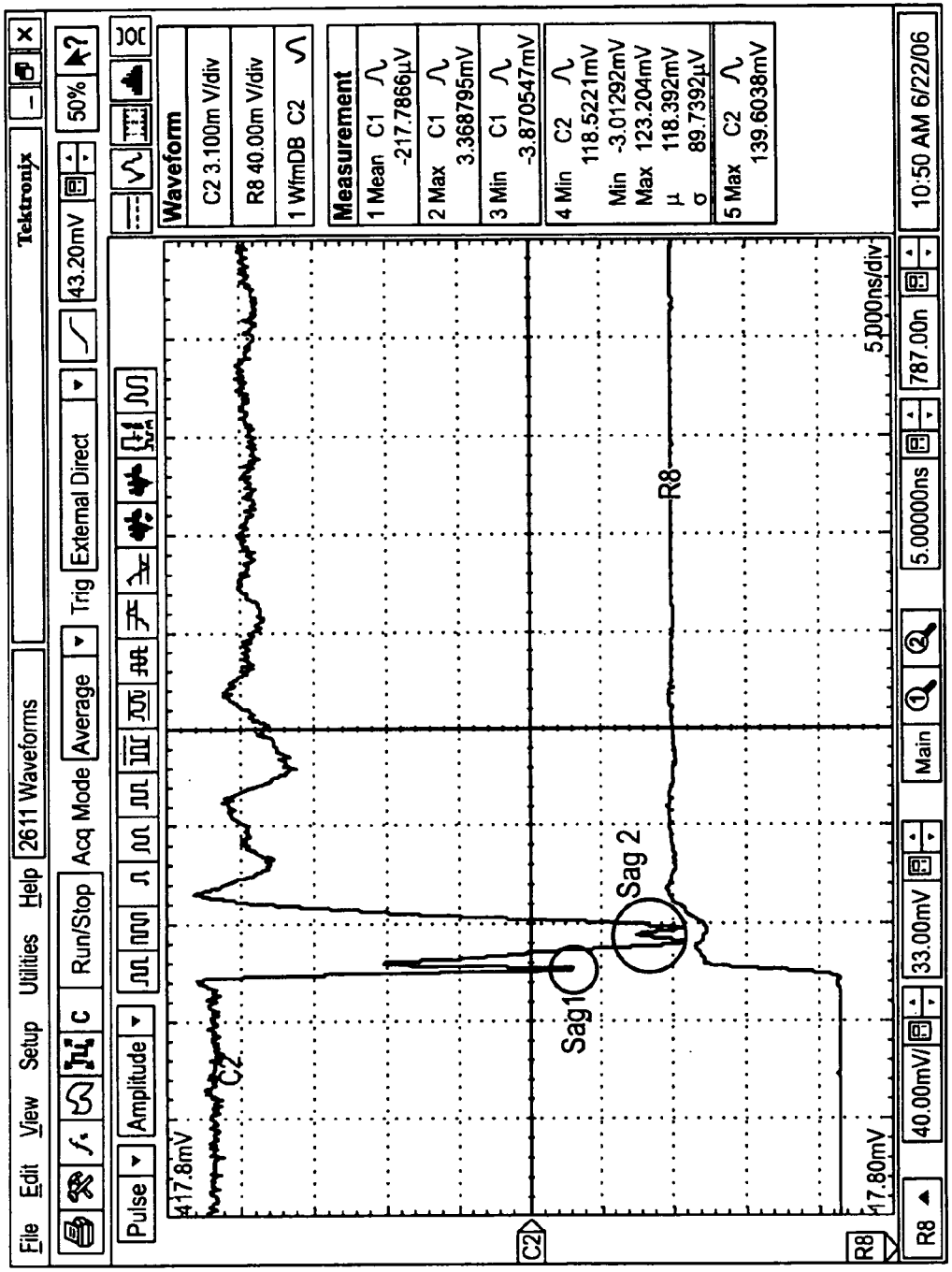
FIG. 3 is a graphical user interface depicting the results from the quiet high noise wave form at the victim pin of FIG. 2 in accordance with one embodiment of the invention.
Figure 4A:
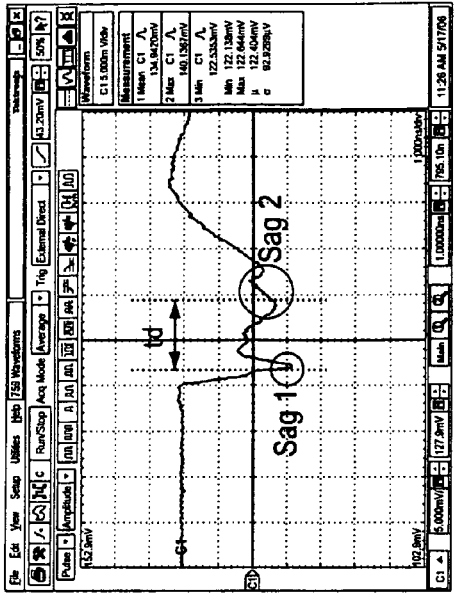
FIGS. 4A through 4D illustrate quiet high noise waveforms at the victim pin of FIG. 2 when different numbers of aggressors are toggling in accordance with one embodiment of the invention.
Figure 4B:
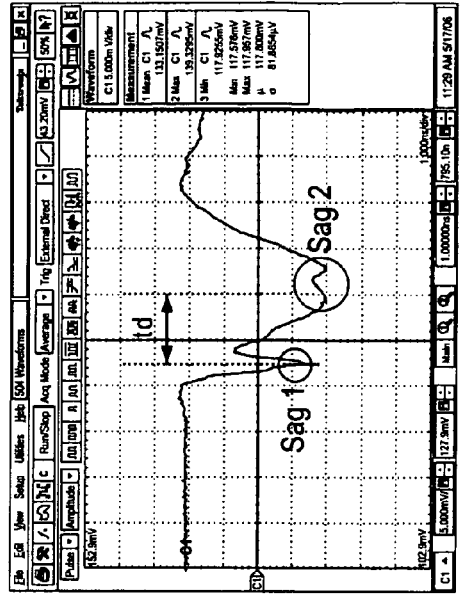
Figure 4C:
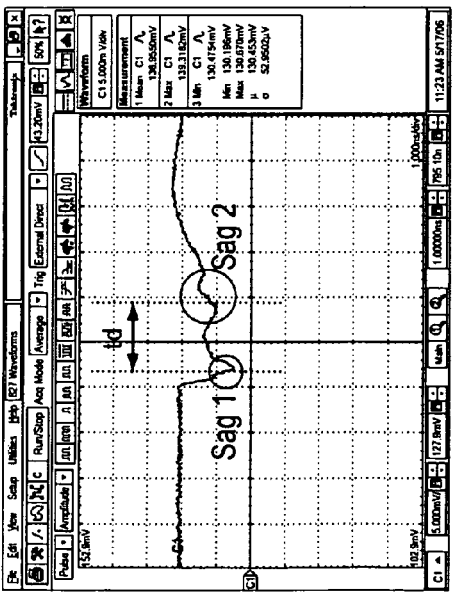
Figure 4D:
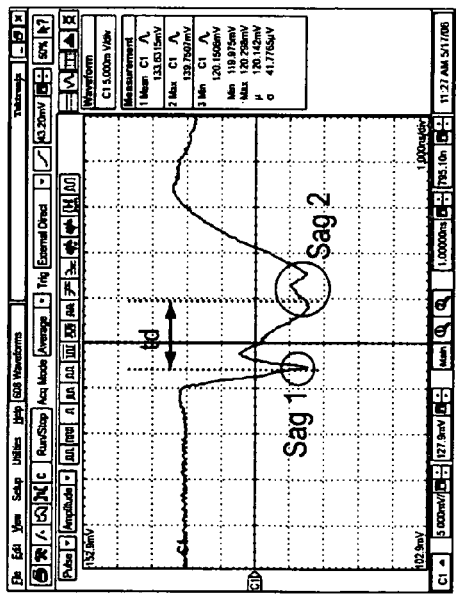

FIG. 3 is a graphical user interface depicting the results from the quiet high noise waveform at the victim pin of FIG. 2 in accordance with one embodiment of the invention. In FIG. 3, the victim pin 130 of FIG. 2 was measured when 87 aggressors were toggling in the SSTL-18 class II 25-ohm OCT case. It should be appreciated that the quiet high noise at victim pin 130 when the 87 aggressors are toggling has two distinct sags, marked as Sag 1 and Sag 2, respectively of FIG. 3. Sag 1 is caused by the inductive crosstalk and has a higher resonant frequency of approximately 1 GHz. Sag 2 is caused by the PDN effect and has a lower resonant frequency of approximately 200 MHz. The different resonant frequencies validate the superimposing property of the two sags, i.e., Sag 1 and Sag 2. FIGS. 4A through 4D illustrate quiet high noise waveforms at the victim pin of FIG. 2 when different numbers of aggressors are toggling in accordance with one embodiment of the invention. In FIG. 4A, eight aggressors were toggling, in FIG. 4B 32 aggressors were toggling, in FIG. 4C 64 aggressors are toggling, and in FIG. 4D, 87 aggressors are toggling. As illustrated in FIGS. 4A-4D, the quiet high noise signature is similar in shape even when different numbers of aggressors are toggling or switching. It should be appreciated that when the number of aggressors reaches 64 or more, i.e., as illustrated in FIGS. 4C and 4D, the contribution from the PDN is greater than that from the crosstalk.

Figure 5A:
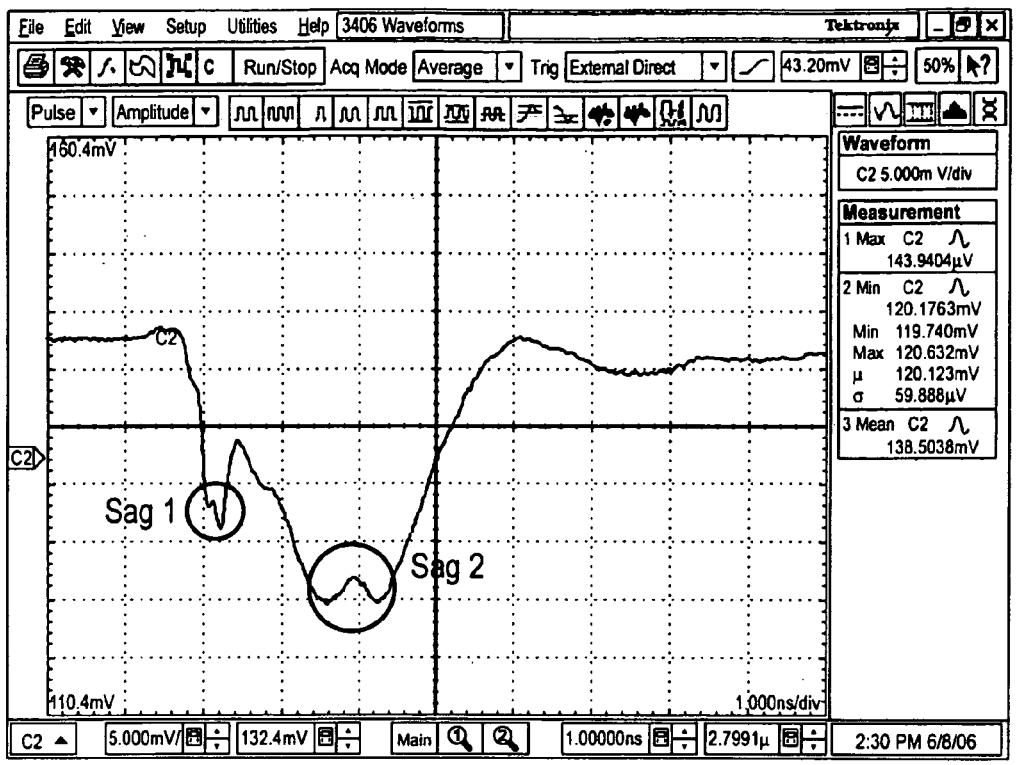
FIGS. 5A and 5B illustrate the quiet high noise characterization at different I/O interfaces in accordance with one embodiment of the invention.
Figure 5B:
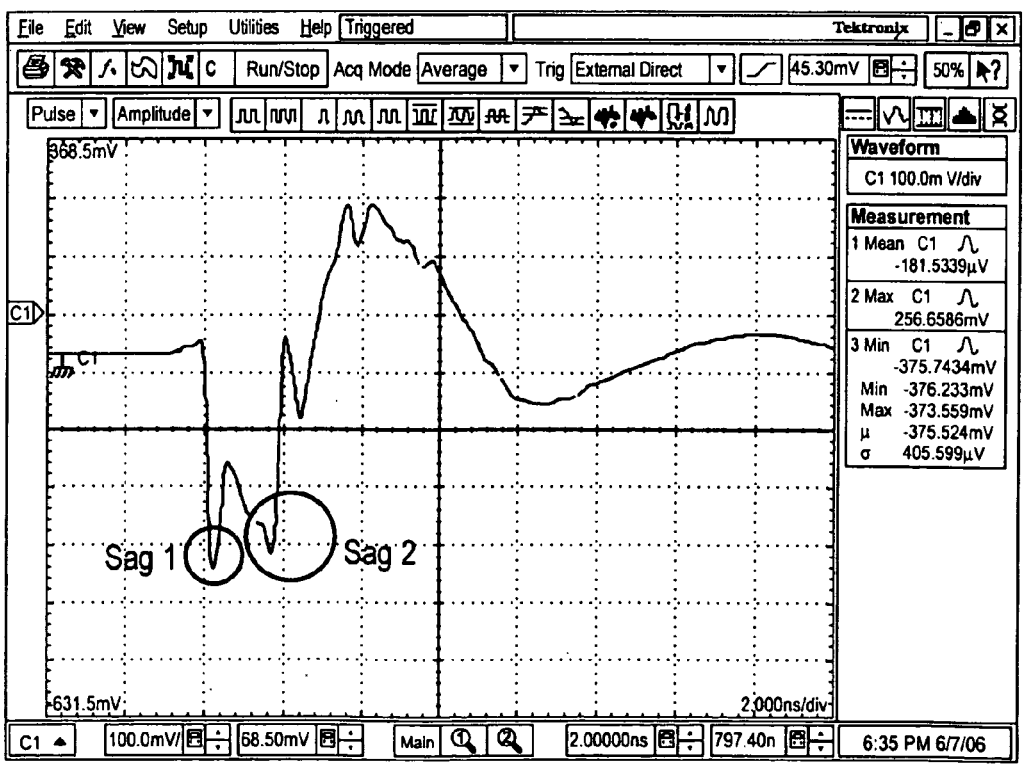

FIGS. 5A and 5B illustrate the quiet high noise characterization at different I/O interfaces in accordance with one embodiment of the invention. In FIG. 5A, the quiet high noise is characterized with a HSTL-18 class II 16 mA current strength with 87 aggressors, while FIG. 5B characterizes the quiet high noise for LVTTL 2.5 V 50-ohm OCT with 87 aggressors. It should be appreciated from the data illustrated from FIGS. 3 through 5B that the quiet high noise waveform has two distinct sags, Sag 1 and Sag 2, which correspond to the crosstalk effect and PDN effect, respectively. The crosstalk sag, Sag 1, has a higher resonant frequency, while the PDN sag, Sag 2, has a much lower resonant frequency. It should be noted that this is true even for SSTL, HSTL, and LVTTL interfaces with differing amounts of aggressors. The quiet high noise amplitude is determined by the lower value between the corresponding crosstalk and the PDN sag. The number of aggressors does not significantly change the time delay between the crosstalk and the PDN sag. The crosstalk sag value is primarily dependent on the mutual inductance between the aggressor and the victim pin, and the number of aggressors. Therefore, the sag value for the crosstalk does not linearly rise with the increase of the number of aggressors. Furthermore, the switching rate of the I/O pins also influences the sag value for the crosstalk. The PDN sag value is primarily dependent on the number of aggressors. Consequently, the sag value linearly rises with the increase in the number of aggressors. It should be noted that the switching rate of the I/O pins also influences the sag value.

Figure 6:
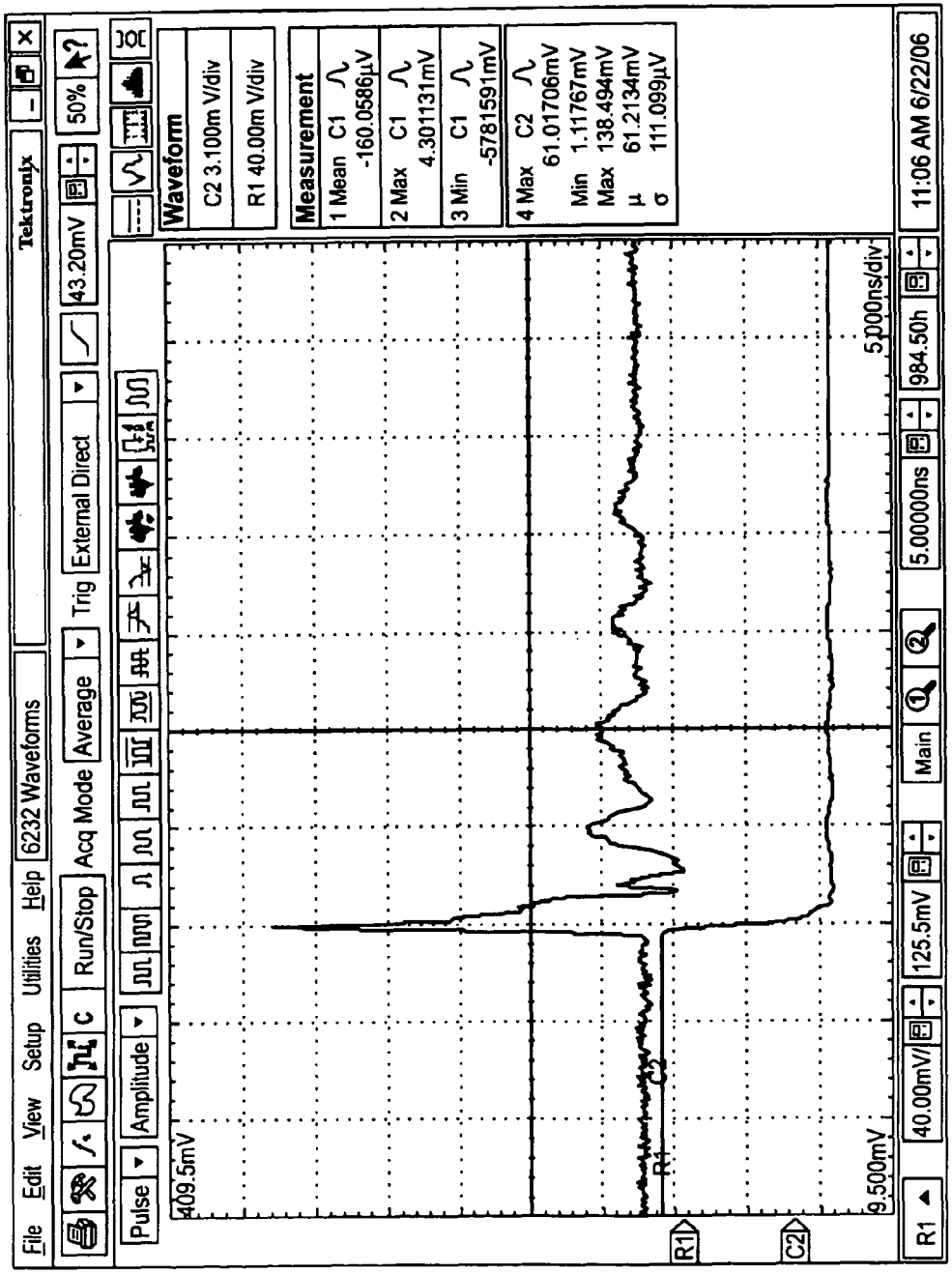
FIG. 6 is a graphical user interface illustrating a quiet low noise waveform at pin 130 of FIG. 2 when 87 aggressors are toggling in accordance with one embodiment of the invention.

FIG. 6 is a graphical user interface illustrating a quiet low noise waveform at pin 130 of FIG. 2 when 87 aggressors are toggling in accordance with one embodiment of the invention. As compared to the quiet high noise in FIGS. 4 through 5B, the waveform of FIG. 6 is simple and the bounce value is only caused by the inductive crosstalk. That is, the inductive will always dominate the quiet low noise.

Figure 7:
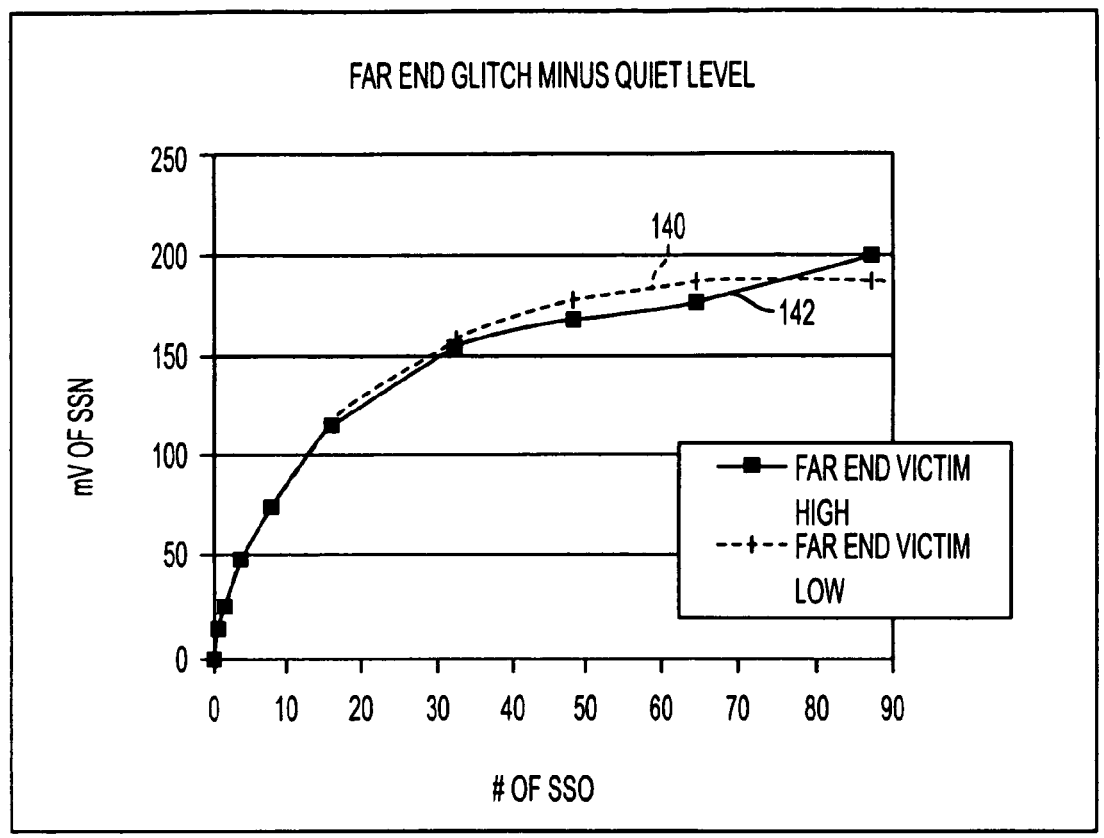
FIG. 7 represents the quiet low and quiet high noise at victim pin 130 of FIG. 2 versus the number of aggressors in accordance with one embodiment of the invention.

FIG. 7 represents the quiet low and quiet high noise at victim pin 130 of FIG. 2 versus the number of aggressors in accordance with one embodiment of the invention. It should be noted that in FIG. 7, the curve is saturated when more outward aggressors are toggling. That is, the inductive crosstalk is dominated by the nearest aggressor around the victim pin. The toggling aggressors, which are relatively far away from the victim pin, have only a negligible contribution because of the weak mutual inductance between them and the victim pin as illustrated by the leveling off of curve 140 of FIG. 7 as the number of SSOs that are toggling increases. However, quiet high curve 142 still increases when more aggressors are toggling, because the PDN sag becomes worse and the sag values have a linear relationship to the number of aggressors, as illustrated with reference to FIGS. 4C and 4D. Accordingly, the quiet low noise waveform has only one bounce, which is caused by the inductive coupling. This is true for SSTL, HSTL, and LVTTL interfaces and different numbers of aggressors. The bounce value for the quiet low noise is primarily dependent on the mutual inductance between the aggressor and the victim pin, and the number of aggressors. In addition, the switching rate of the I/Os also influences the bounce value.

Figure 8:
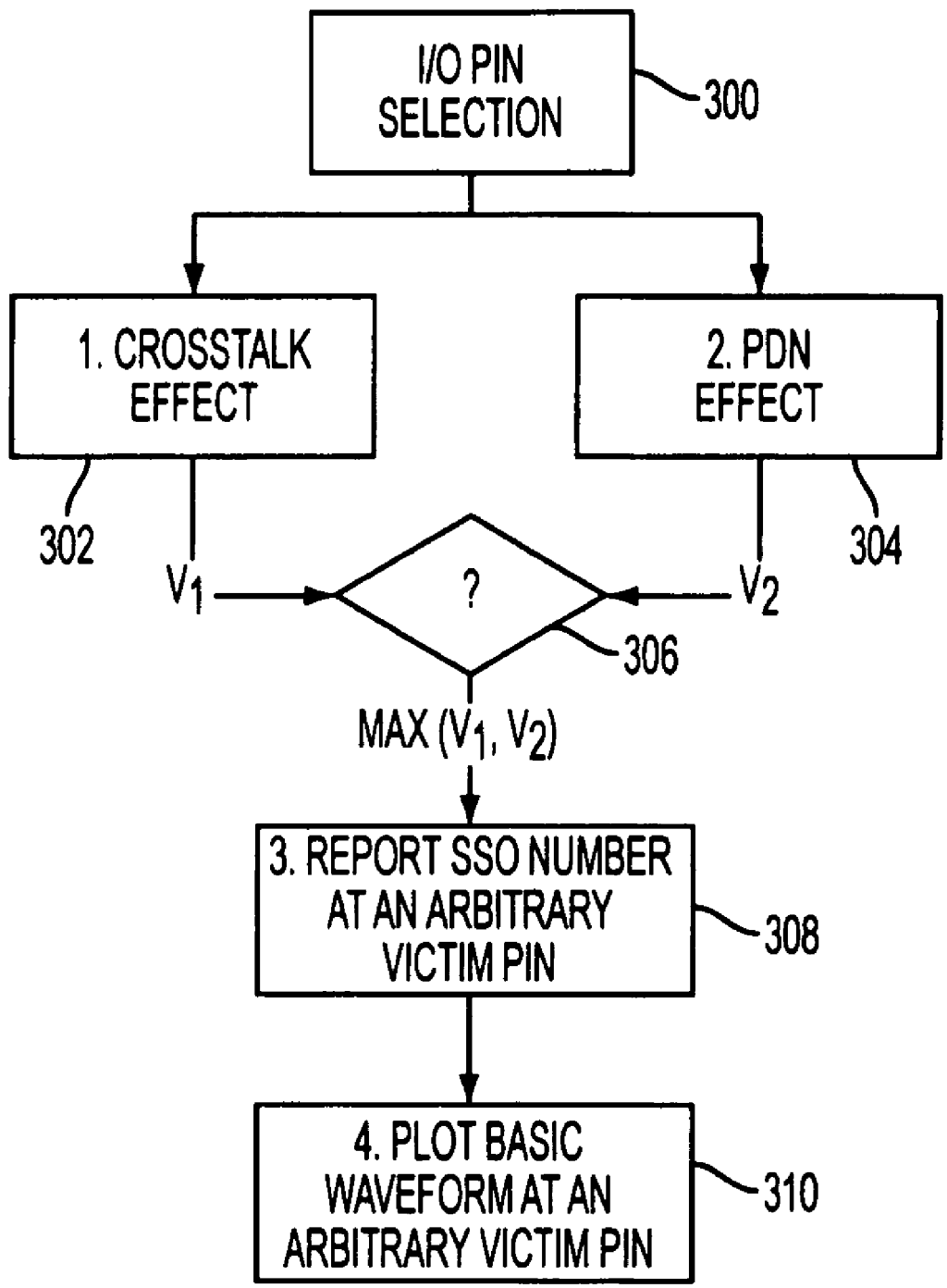
FIG. 8 is a flow chart diagram illustrating the specifics for determining SSN effects from the crosstalk and the PDN in accordance with one embodiment of the invention.

FIG. 8 is a flow chart diagram illustrating the specifics for determining SSN effects from the crosstalk and the PDN in accordance with one embodiment of the invention. As noted above, the entire procedure does not require a SPICE-like circuit simulation engine and can easily be coded with a high level programming language such as MATLAB. The flow chart initiates with operation 300 where the I/O pin selection is provided. As mentioned with reference to FIG. 1, the pin selection may be provided by an end user or customer. In one embodiment, the pin number, pin location, and I/O standard are provided here. The method then advances to operations 302 and 304 where the crosstalk effect is determined in operation 302 and the PDN effect is determined in operation 304. As illustrated in FIG. 8, these determinations can be made in parallel, but does not necessarily have to be in parallel. The output from operation 302 and 304 is compared in decision operation 306 where the maximum value between the crosstalk effect and the PDN effect are selected. Of course, for the quiet low noise, the crosstalk effect is selected. The method then advances to operation 308 where the SSO number is reported at an arbitrary victim pin. The method then proceeds to operation 310 where the basic waveform is plotted for the arbitrary victim pin. It should be appreciated that the quiet high noise is defined as the voltage side amplitude at a victim pin, which is held at a logic high state, while the quiet low noise is defined as the voltage bounce at a victim pin which is held at a logic low state.

Figure 9A:
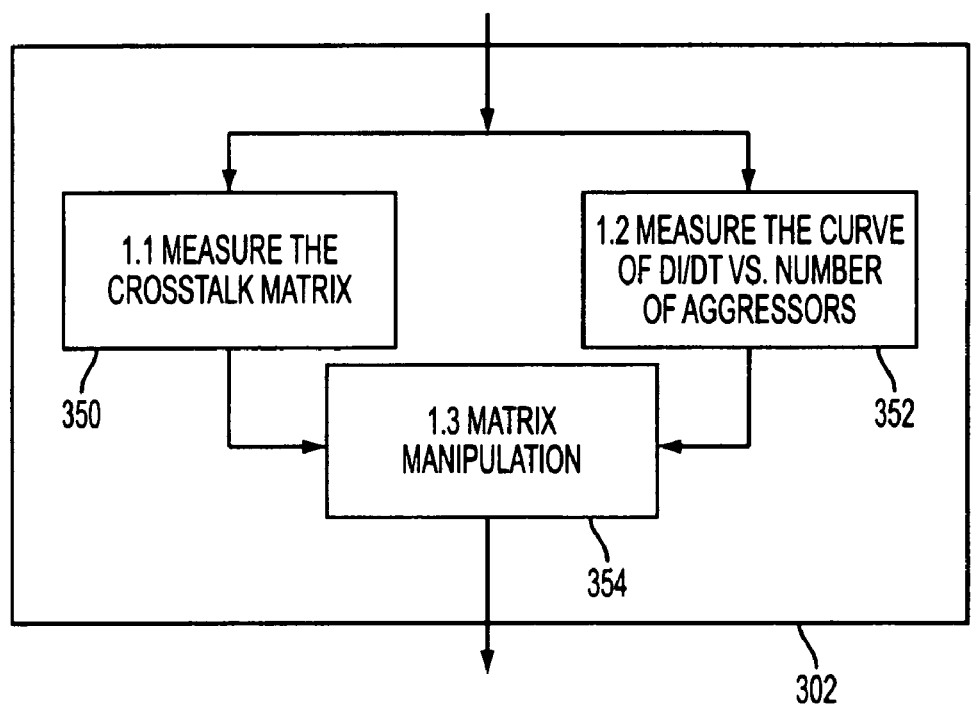
FIG. 9A further illustrates the method operations for determining the crosstalk in operation 302 of FIG. 8.

FIG. 9A further illustrates the method operations for determining the crosstalk in operation 302 of FIG. 8. In FIG. 9, the crosstalk effect is determined by measuring the crosstalk matrix in operation 350 and measuring the switching rate, (di/dt) versus the number of aggressors in operation 352. Matrix manipulation is then performed in operation 354 to determine the output for the crosstalk effect. In operation 350 where the crosstalk matrix is measured, it should be appreciated that this matrix is generated offline and characterized for a certain PLD. Thus, through the measurement similar to that described with regard to FIG. 2, a crosstalk matrix is generated that describes the impact on toggling pins upon a victim pin. Accordingly, a database for specific designs can be captured one at a time and then reused for different customers or end users based on the product design. In other words, the crosstalk matrix contains the mutual inductive relationships between any two I/O pins in a package. It should be appreciated that certain types of FPGA packages may contain over 1000 pins, which would mean that the crosstalk matrix would include a matrix having over 1000 rows and 1000 columns, where the rows represent victim pin positions while the columns represent aggressor pin positions. Accordingly, all the diagonal elements of the crosstalk matrix would equal zero.

Figures 9B, 9C:
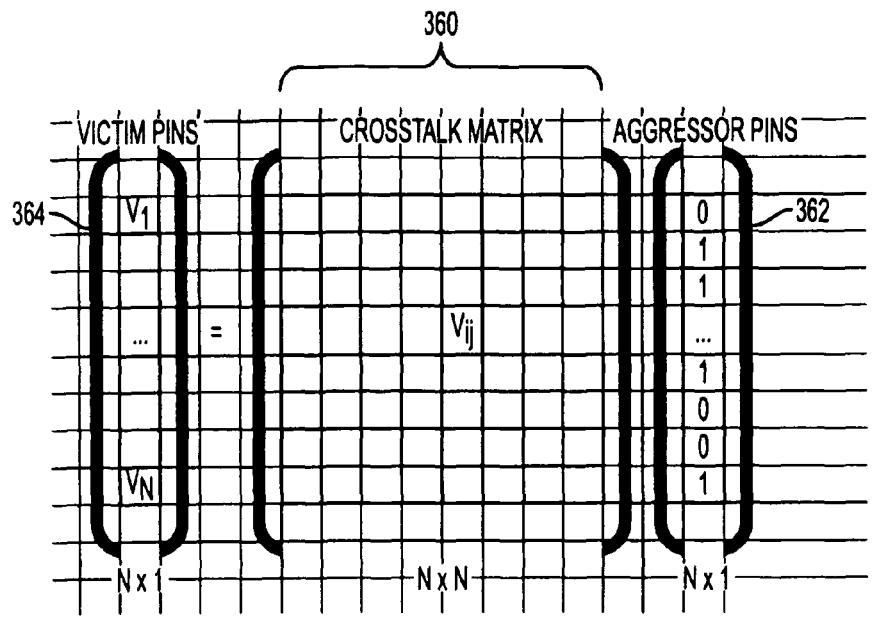
FIG. 9B is a simplified schematic diagram representing the matrix manipulation of operation 354 of FIG. 9A in accordance with one embodiment of the invention.
FIG. 9C is a simplified schematic diagram representing an I/O count per bank table that normalizes the switching rate for many toggling I/O pins with respect to that at 1 toggling I/O in accordance with one embodiment of the invention.

FIG. 9B is a simplified schematic diagram representing the matrix manipulation of operation 354 of FIG. 9A in accordance with one embodiment of the invention. Crosstalk matrix 360 represents the mutual inductive relationship between any two I/O pins in the device. The element $V_{ij}$ (i, j=1, 2, ..., N) in the crosstalk matrix is the voltage coupled at the quiet victim Pin i when the aggressor Pin j is toggling, and it is expressed as a simple equation $$V_{ij} = M_{ij} \frac{dI_j}{dt}$$

where $M_{ij}$ is the mutual inductance between Pin i and Pin j, $I_j$ is the current on Pin j. The property of crosstalk matrix 360 summarized as follows:

Matrix 360 is a symmetrical matrix, i.e., $V_{ij}=V_{ji}$ (i, j=1, 2, ..., N);
All the diagonal elements $V_{ij}=0$, i=1, 2, ... N;
When either Pin i or Pin j is not a parallel I/O pin, (it might be a power or a ground or a transceiver or a programming pin), $V_{ij}=0$;
$V_{ij}$ is measured at a certain switching rate ($dI_j/dt$), i.e., only an aggressor is toggling.

Figure 9D:
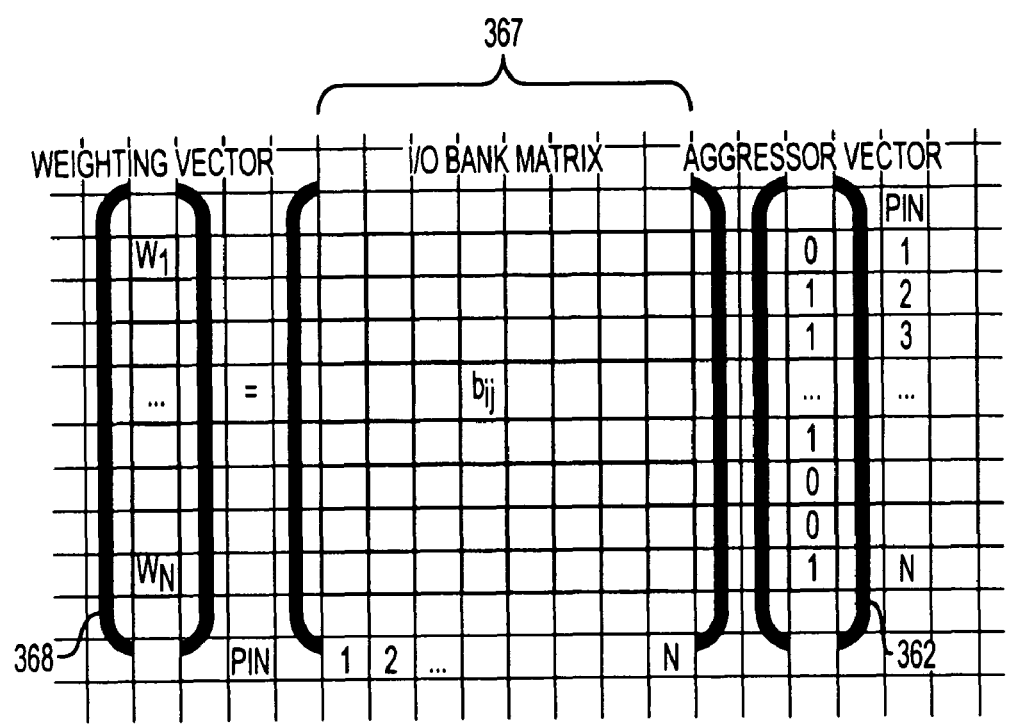
FIG. 9D is a simplified schematic diagram where the number of I/O pins in every bank is quantified to eventually yield a scaling vector, also referred to as a weighting vector in accordance with one embodiment of the invention.

In reality, the value of $V_{ij}$ approaches zero when Pin i and Pin j are located far away from each other. Therefore, the crosstalk matrix is a sparse matrix in nature, and the matrix manipulation will become more efficient by using the sparse matrix's particular features. For the aggressor vector 362, the method for determining its elements is described as follows:

For a toggling aggressor I/O, it should be "1";
For a non-toggling I/O pin or non-I/O pin, it should be "0";

FIG. 9C is a simplified schematic diagram representing an I/O count per bank table that normalizes the switching rate for many toggling I/O pins with respect to that at 1 toggling I/O in accordance with one embodiment of the invention. The I/O switching rate (di/dt) in one I/O bank usually becomes slower when more POs in the bank are toggling. This phenomenon causes the inductive crosstalk saturation with large number of toggling I/O pins. By normalizing the switching rate at many toggling POs case with respect to that at 1 toggling I/O case, results in the generation of I/O count per bank table 366. Table 366 has the following properties:

N is the total pin number for an FPGA package, and M is the total number of toggling I/O in the I/O bank associated with the pin number on the left. The more I/Os are toggling in one I/O bank, the slower the switching rate of POs in this bank.
$s_{i1}=1$ (i=1, 2, 3, ... N), and $0<s_{ij}1$ (i=1, 2, 3, ..., j=2, 3, ..., M);
$s_{i(j+1)} \leq s_{ij}$ (j=1, 2, 3, ..., M);

FIG. 9D is a simplified schematic diagram where the number of I/O pins in every bank is quantified to eventually yield a scaling vector, also referred to as a weighting vector in accordance with one embodiment of the invention. The number of toggling I/Os in every I/O bank are quantified through I/O bank matrix 367. The elements of aggressor vector 362 are multiplied by the corresponding elements of I/O bank matrix 367 to yield weighting vector 368. I/O bank matrix 367 is defined as follows:

$b_{ij}=1$ or 0;
For an arbitrary Pin i, $b_{ii}=1$; $b_{ij}=1$ if Pin j is in the same I/O bank as Pin i;
For Pin i and j, $b_{ik}=b_{jk}=1, 2, ..., N)$.

Figure 9E:
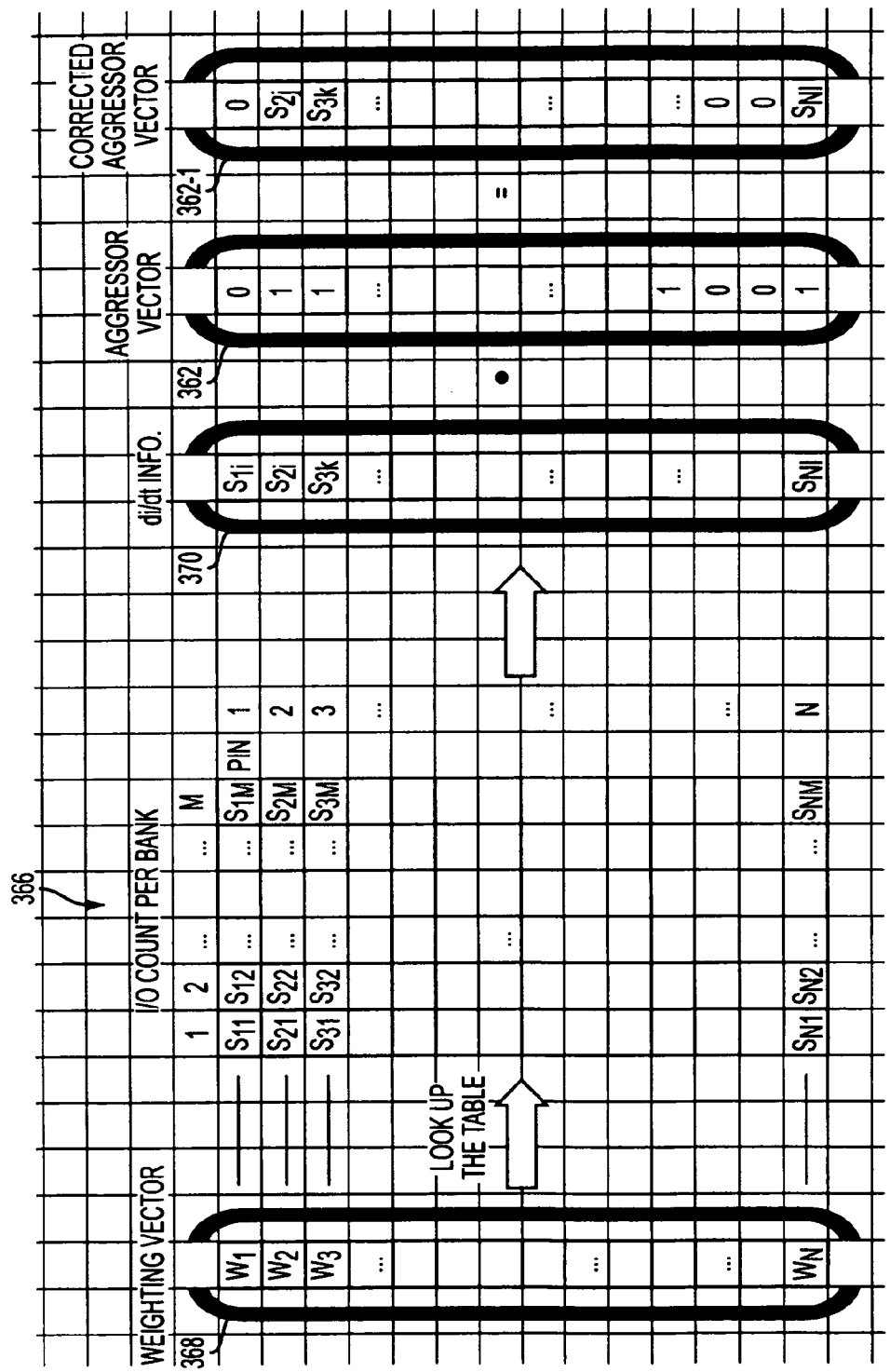
FIG. 9E is simplified schematic diagram illustrating the extraction of the di/dt information vector in accordance with one embodiment of the invention.

The properties of weighting vector 368 is described as follows:

$W_i=0$ if there is no toggling I/Os in the I/O bank where Pin i is located;
$W_i=k$, where k is the number of toggling I/Os in the I/O bank where Pin i is located;

FIG. 9E is simplified schematic diagram illustrating the extraction of the di/dt information vector in accordance with one embodiment of the invention. As shown in FIG. 9E weighting vector 368 can be used to look up the switching rate table, i.e., I/O count per bank table 366. That is from weighting vector 368, the number of I/O pins switching in the I/O bank is used to select the proper $s_{value}$ from Table 366 and drop that value into di/dt information vector 370. This is done for each entry of weighting vector 368. When di/dt information vector 370 is extracted, a "dot" product is performed between this vector and aggressor vector 362 to yield corrected aggressor vector 362-1.

Figure 9F:
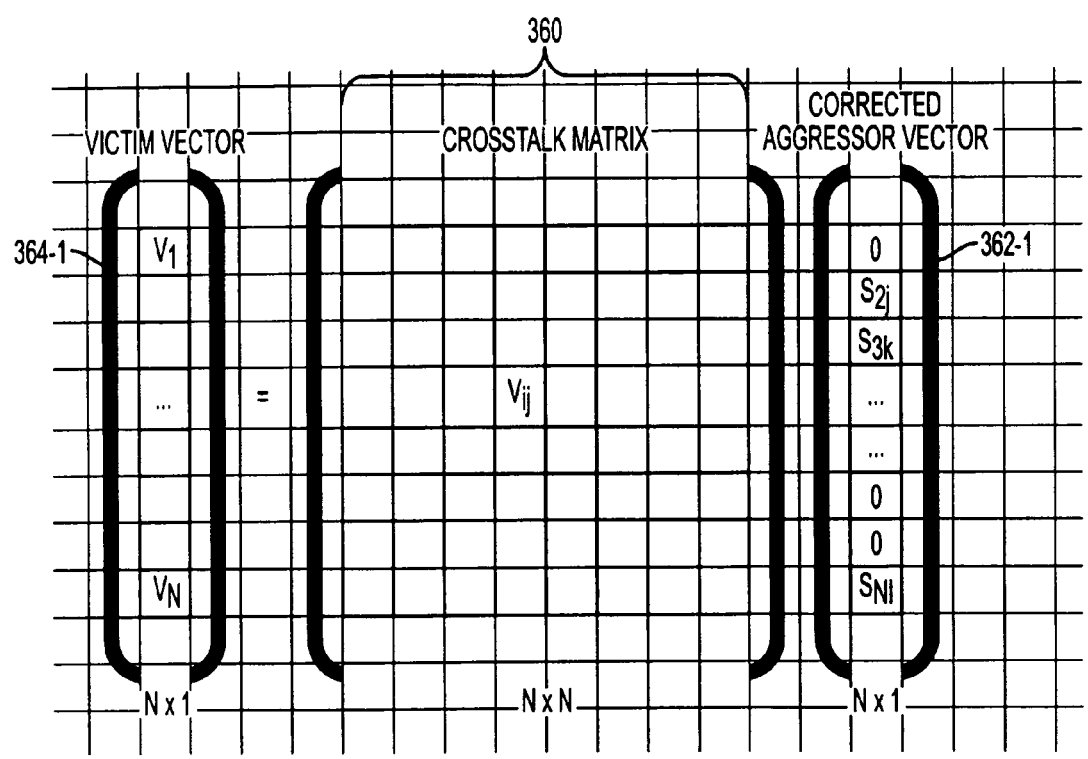
FIG. 9F is a simplified schematic diagram illustrating completion of the crosstalk effect contribution when considering the cumulative impact of all the toggling pins in the I/O bank in accordance with one embodiment of the invention.

FIG. 9F is a simplified schematic diagram illustrating completion of the crosstalk effect contribution when considering the cumulative impact of all the toggling pins in the I/O bank in accordance with one embodiment of the invention. By substituting the corrected aggressor vector into FIG. 9F, Operation 302 of FIGS. 8 and 9A is completed, and the inductive crosstalk contribution is accurately quantified in a manner that considers the cumulative effect of the toggling I/O pins rather than just the effect of a single toggling I/O pin. Furthermore, the crosstalk effect is calculated in a relatively short period of time for the degree of accuracy provided.

Figure 10:
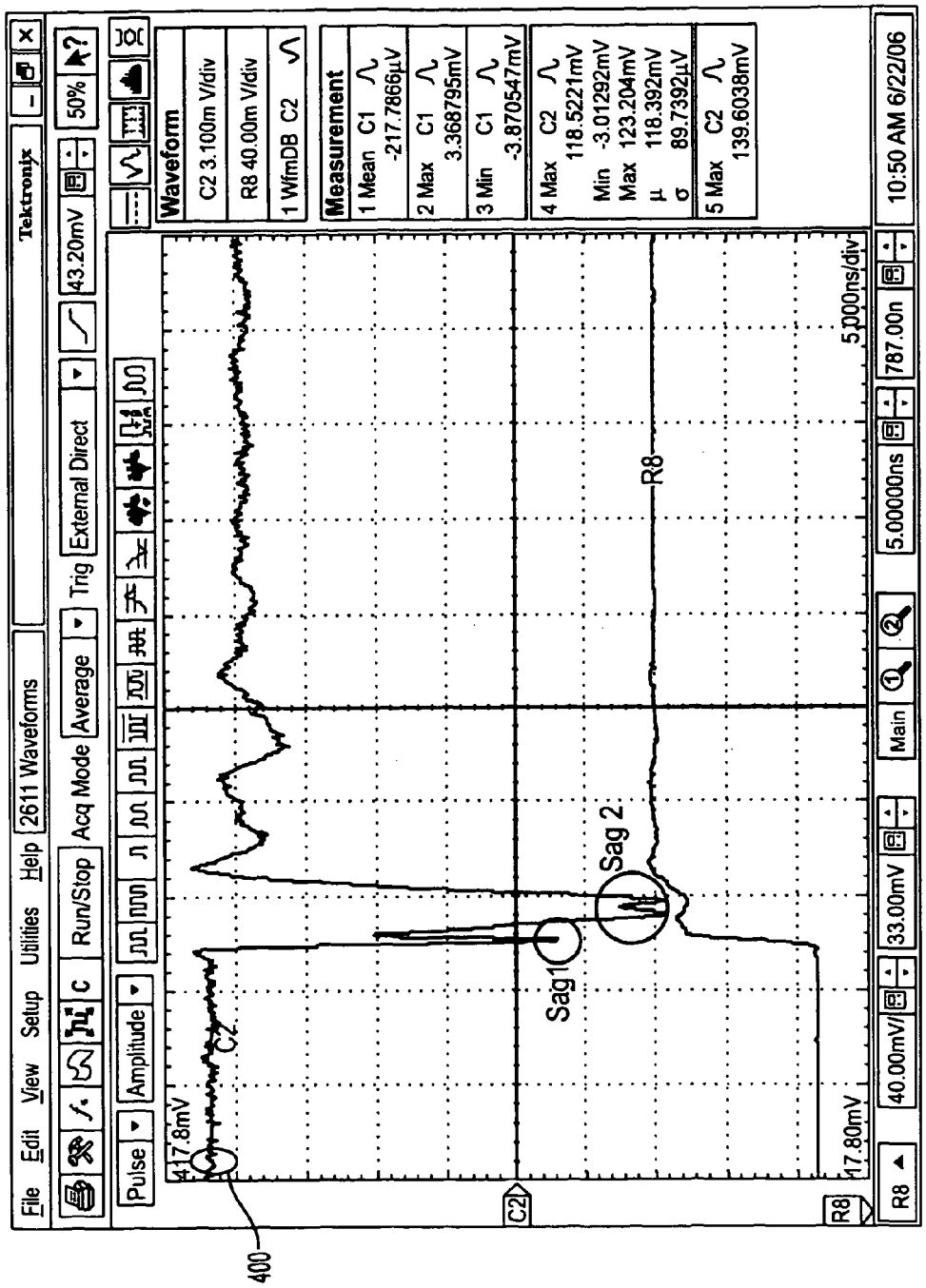
FIG. 10 is a simplified schematic diagram illustrating a graphical user interface for a quiet high noise waveform generated in accordance with one embodiment of the invention.
Figure 11:
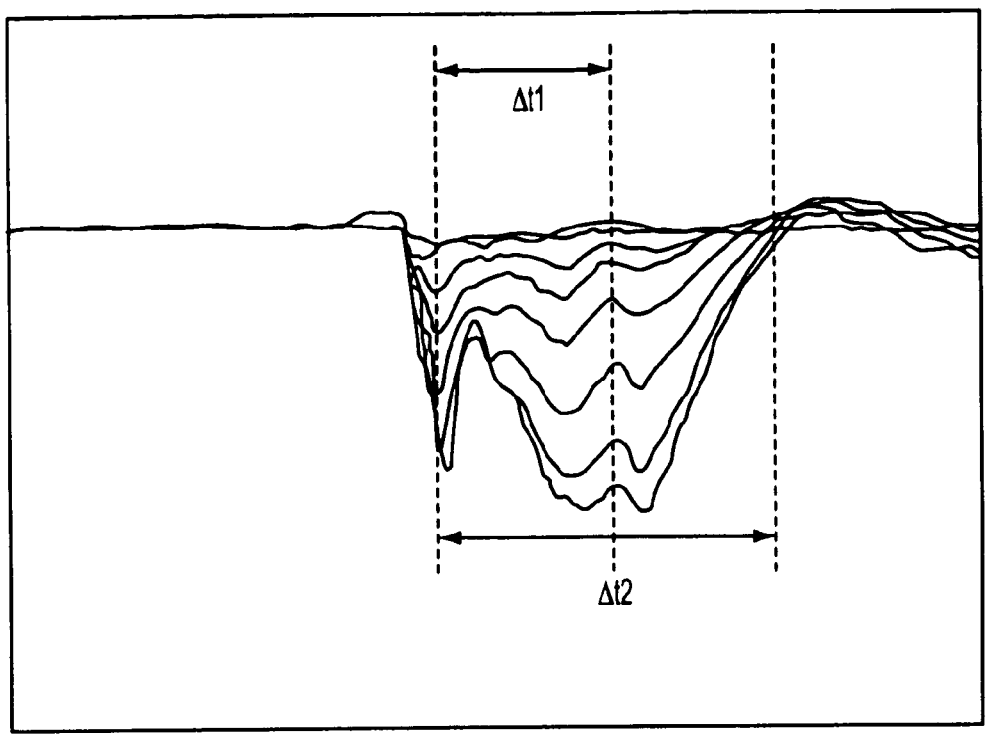
FIG. 11 is a graphical diagram illustrating the measured waveforms of quiet high noise for different numbers of toggling aggressors in accordance with one embodiment of the invention.
Figure 12:
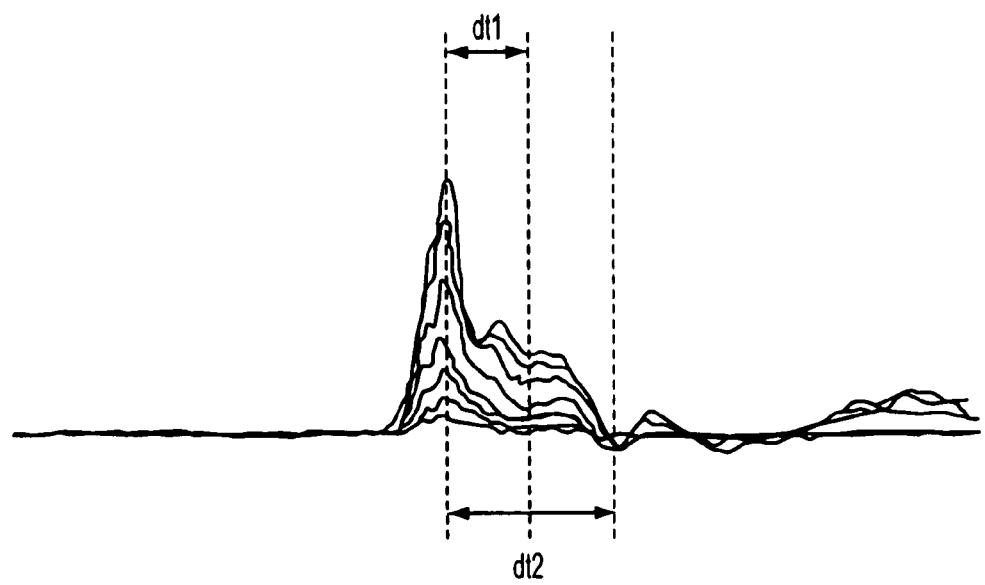
FIG. 12 is a graphical diagram illustrating the measured waveforms of quiet low noise for different numbers of toggling aggressors in accordance with one embodiment of the invention.

FIG. 10 is a simplified schematic diagram illustrating a graphical user interface for a quiet high noise waveform generated in accordance with one embodiment of the invention. FIG. 10 illustrates the results for the contribution from the inductive crosstalk and the PDN in waveform 400. As illustrated in FIG. 10, the value of Sag 2 determines the PDN contribution to the SSN. As stated above, the value of Sag 2 linearly increases with the number of toggling aggressors. The comparison of sag 1 and sag 2 determines the worst case between the inductive crosstalk and the PDN for the noise. Thus, in operation 306 of FIG. 8, the values of Sag 1 and Sag 2 are compared to determine a maximum between the two values in one embodiment. As noted above, the inductive crosstalk always dominates the quiet low noise, while either the inductive crosstalk or the PDN sag can dominate the quiet high noise. FIG. 11 is a graphical diagram illustrating the measured waveforms of quiet high noise for different numbers of toggling aggressors in accordance with one embodiment of the invention. FIG. 12 is a graphical diagram illustrating the measured waveforms of quiet high noise for different numbers of toggling aggressors in accordance with one embodiment of the invention. It should be noted that the signatures for the quiet high and the quiet low noise waveforms are similar even when different numbers of aggressors are toggling. In addition, the timing relationship between the first and the second sag/bounce are almost the same for different numbers of toggling aggressors.

Figure 13A:
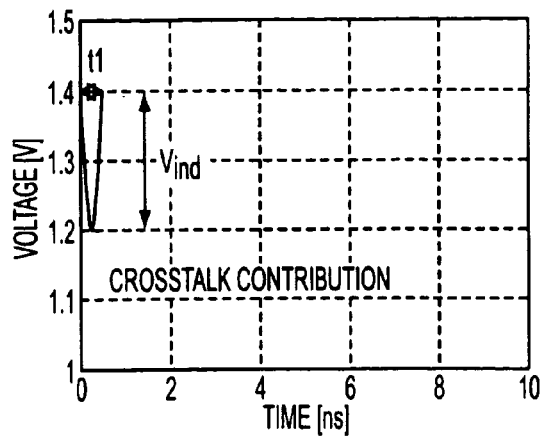
FIGS. 13A through 13C represent schematic illustrations of quiet high noise waveforms being reconstructed in accordance with one embodiment of the invention.
Figure 13B:
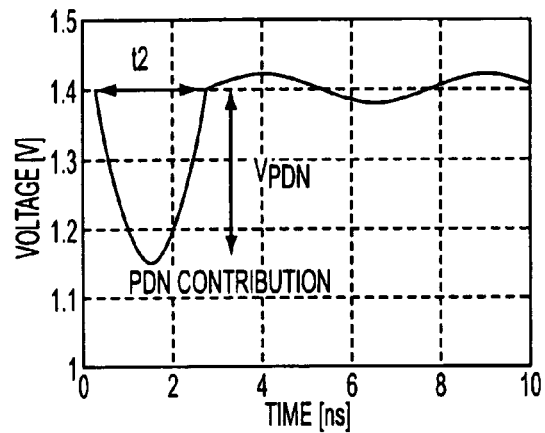
Figure 13C:
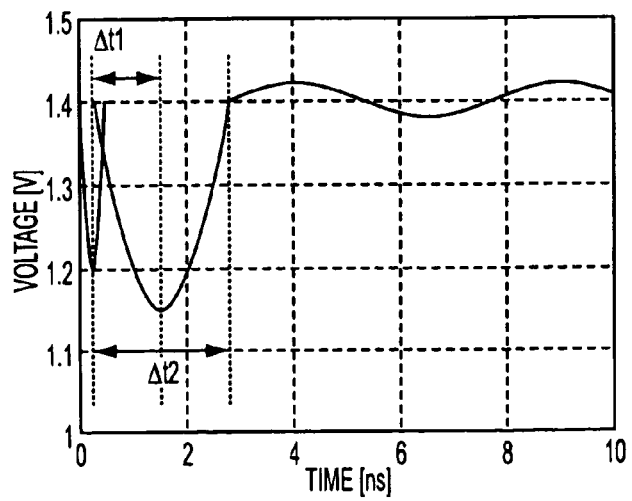

FIGS. 13A through 13C represent schematic illustrations of quiet high noise waveforms being reconstructed in accordance with one embodiment of the invention. FIG. 13A illustrates the inductive crosstalk contribution, while FIG. 13B illustrates the PDN contribution to the noise. FIG. 13C is the combination of FIGS. 13A and 13B. It should be appreciated that in FIGS. 13A and 13B, t1 and t2 reflect the resonant frequencies of the crosstalk and the PDN sags, and they are almost constant across different toggling aggressors as illustrated in FIGS. 11 and 12. $V_{ind}$ and $V_{pdn}$ are measured with the timing parameters delta t1 and delta t2, waveforms.

Figure 14:
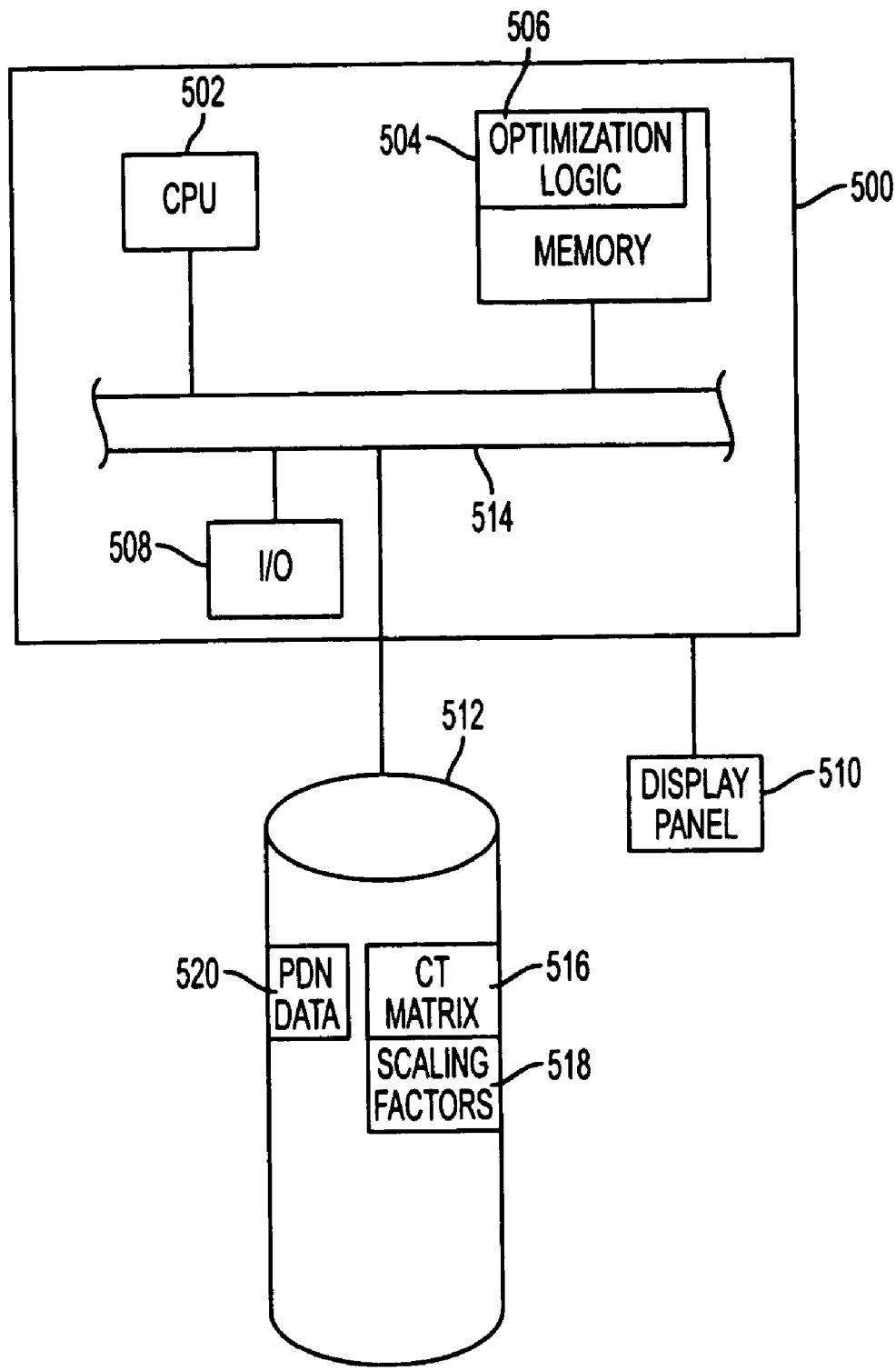
FIG. 14 is a simplified schematic diagram illustrating a system for optimizing pin selection for an integrated circuit in accordance with one embodiment of the invention.

FIG. 14 is a simplified schematic diagram illustrating a system for optimizing pin selection for an integrated circuit in accordance with one embodiment of the invention. Computing device 500 includes central processing unit (CPU) 502 and memory 504, which includes optimization logic 506 stored therein. Optimization logic 506 performs the functionality described with reference to FIGS. 8-13C in one embodiment. Computing device 500 includes I/O block 508. Data base 512 is in communication with computing device 500. Within database 512 is stored crosstalk matrix 516, scaling factors 518, and PDN data 520. Crosstalk matrix 516 may include tables discussed above with reference to FIGS. 9A-9F, in addition to the crosstalk matrix. One skilled in the art will appreciate that a vendor may characterize the crosstalk matrices and associated tables discussed above offline and store this data within data base 512. In addition, the scaling factors and PDN data may all be characterized separately for each device and I/O standard for use with the embodiments described herein.

In summary, the above-described invention provides for an accurate analysis as the methodology is based on the I/O SSN mechanisms such as, crosstalk, Power Distribution Network noise, PDN resonance, reflection, etc. Quick analysis is feasible since the methodology breaks down and analyzes the problem in small blocks. To further expedite analysis time, one could choose to analyze only major I/O SSN mechanisms, but not minor IO SSN mechanisms in one embodiment. As mentioned above, major IO SSN mechanisms are the mechanisms that cause most if not all of IO system noise that IO system designers (customers) should pay attention to and minor IO SSN mechanisms contribute relatively small amounts if anything to overall JO system noise. However, minor IO mechanism analysis could be useful to IC designers or package designers in order to improve IO circuit designs or package designs. This new I/O SSN analysis tool also produces both voltage amplitude and timing information. It should be appreciated that while some of the examples described above mention PLDs, this is not meant to be limiting as the embodiments may be applied to any integrated circuit to optimize pin placement and enhance signal and power integrity.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method comprising:
    mapping pin locations for an integrated circuit to a vector;
    capturing mutual inductive relationships between pins of the integrated circuit into a matrix;
    characterizing an impact of the mutual inductive relationships on a pin while the pin is at a quiet state based on a combination of the vector and the matrix; and
    generating a pin map representing mutual inductive relationship for each of a plurality of pins of the integrated circuit, wherein the mapping, capturing, characterizing and generating are executed through a processor.

2. The method of claim 1, wherein the mapping includes:
    identifying the pin locations in the vector as being one of enabled or disabled.

3. The method of claim 1, wherein the capturing includes:
    toggling neighboring pins proximate to one of the pins, the one of the pins remaining at one of a logic high or a logic low state; and
    capturing an impact on the one of the logic high or the logic low state due to the toggling.

4. The method of claim 3, wherein the toggling neighboring pins proximate to one of the pins includes:
    toggling a first subset of the neighboring pins proximate to one of the pins, the one of the pins remaining at one of a logic high or a logic low state;
    capturing an impact on the one of the logic high or the logic low state due to the toggling; and
    successively repeating the toggling and the capturing for a next subset of the neighboring pins, wherein the next subset includes the first subset and additional neighboring pins.

5. The method of claim 1, wherein the characterizing includes;
    considering a cumulative effect of multiple pins switching in an area around the pin.

6. The method of claim 1, wherein the characterizing includes:
    determining a number of pins switching around the pin;
    calculating a cumulative effect of the mutual inductive relationships on the pin based on the number of pins switching; and
    updating the vector according to the cumulative effect.

7. The method of claim 1, further comprising:
calculating a power distribution network (PDN) impact on the quiet state of the pin.

8. The method of claim 7, wherein the calculating a power distribution network (PDN) impact on the quiet state of the pin includes:
successively transitioning an increasing amount of pins around the pin;
characterizing the PDN impact for each successive transitioning on the pin;
comparing the PDN impact with a corresponding impact of the mutual inductive relationship to identify a worst case impact on the pin; and
reporting the worst case impact.

9. The method of claim 8, further comprising:
determining timing parameters for the PDN impact and the corresponding impact;
constructing a waveform illustrating the timing parameters; and
adjusting timing of signals to the pin locations based on the waveform.

10. The method of claim 1, wherein software instructions for implementing the mapping, capturing, characterizing and generating are embodied on a computer readable non transient storage medium.

11. A method, comprising:
selecting pin locations for an integrated circuit;
individually quantifying simultaneous switching noise (SSN) cause mechanisms impacting signal and power integrity;
selecting a worst case cause mechanism from the individually quantified cause mechanisms; and
generating a pin map representing the worst case cause mechanism for each of a plurality of pins of the integrated circuit, wherein the selecting pin locations, quantifying, selecting the worst case, and the generating are executed through a processor.

12. The method of claim 11, wherein the individually quantifying includes:
characterizing an inductive crosstalk effect on each pin from neighboring pins;
characterizing a power distribution effect on each pin from the neighboring pins;
characterizing an edge rate effect of buffers;
characterizing a reflection effect; and
characterizing a loading effect.

13. The method of claim 11, wherein the individually quantifying includes:
characterizing an inductive crosstalk effect on each individual pin from neighboring pins at varying amounts of the neighboring pins switching states.

14. The method of claim 13, wherein the characterizing is performed while each individual pin is maintained at a quiet high state and at a quiet low state.

15. The method of claim 11, wherein the quantifying considers an impact of multiple pins switching and a cumulative effect of the multiple pins switching on signal integrity of a pin maintained at one of a logic high level or a logic low level.

16. The method of claim 15, further comprising:
plotting an impact of a change in current from an amount of toggling pins on a signal of a pin maintained at a logic high level against the cumulative effect of the multiple pins switching on signal integrity of the pin maintained at the logic high level; and
determining a time interval to avoid sampling the pin based on the plotting.

17. The method of claim 11 wherein the quantifying considers an impact of a change in current from an amount of toggling pins on a signal of a pin maintained at a logic high level.

18. A system comprising:
a database having a crosstalk matrix representing mutual inductive relationships between any two pins of an integrated circuit;
a central processing unit (CPU);
a memory having optimization logic stored therein, the optimization logic configured to be executed by the CPU, the optimization logic configured to access pin placement data for the integrated circuit, wherein the optimization logic calculates an impact on signal integrity from an inductive crosstalk effect, the impact from the inductive crosstalk effect determined by combining the pin placement data with the crosstalk matrix resulting in generation of a listing of voltages experienced by each pin of the integrated circuit due to the inductive crosstalk effect; and
a bus enabling communication between the CPU, the memory and the database.

19. The system of claim 18, wherein the database includes an I/O bank matrix that quantifies a number of pins toggling in each I/O bank, and a scaling factor look up table that tabulates scaling factors for each pin according to the number of pins toggling in each I/O bank, the scaling factors each representing a cumulative effect of the mutual inductive relationships on a pin based on the number of pins toggling.

20. The system of claim 18, wherein the optimization logic is further configured to determine an impact on signal integrity from a power distribution network (PDN) effect, the PDN effect determined through a PDN database stored within the database, the PDN database characterizing a voltage sag on each pin of an I/O bank caused by transitioning pins within the I/O bank.

21. The system of claim 20, wherein the optimization logic is further configured to compare the inductive crosstalk effect for a pin of the pin placement data with a corresponding PDN effect for the pin to determine a worst case effect, the worst case effect being graphically presented on a display panel of the system.

22. The system of claim 21, wherein the optimization logic is configured to graphically display a waveform of the crosstalk effect and the PDN effect, thereby illustrating a window of time to avoid sampling the pin.

* * * * *